United States Patent [19]

Sica, Jr.

[11] Patent Number: 4,888,816
[45] Date of Patent: Dec. 19, 1989

[54] TWO-WAY OPTIC COMMUNICATION SYSTEM FOR ATMOSPHERIC USE

[75] Inventor: Louis Sica, Jr., Alexandria, Va.

[73] Assignee: The United States of America as represented by the Secretary of the Navy, Washington, D.C.

[21] Appl. No.: 293,788

[22] Filed: Jan. 5, 1989

[51] Int. Cl.$^4$ .............................................. H04B 9/00
[52] U.S. Cl. ...................................... 455/607; 370/2; 455/617
[58] Field of Search ............... 455/605, 607, 608, 606, 455/609, 610, 611, 612, 613, 616, 617, 618, 619; 370/2, 4; 356/351

[56] References Cited

U.S. PATENT DOCUMENTS

| | | | |
|---|---|---|---|
| 4,280,764 | 7/1981 | Sica et al. | 356/35.5 |
| 4,491,867 | 1/1985 | Huignard | 358/118 |
| 4,533,247 | 8/1985 | Epworth | 356/345 |

FOREIGN PATENT DOCUMENTS 61-94632 10/1985 Japan .................................. 455/605

OTHER PUBLICATIONS

Article entitled "Interferometer With a Self-Pumped Phase-Co".

*Primary Examiner*—Benedict V. Safourek
*Assistant Examiner*—L. Van Beer
*Attorney, Agent, or Firm*—Thomas E. McDonnell; A. David Spevack; Elmer Goshorn

[57] ABSTRACT

An improved laser-driven, two-way optic communication system for atmospheric use and enabling communication between remote stations. The system is generally made up of a transmitter-receiver (TR) arrangement at one station and a cooperative transmitter-receiver (CTR) arrangement at another station. The TR arrangement is generally made up of laser source beam means, polarizer means, polarized beam rotater means and appropriate lens means. The CTR arrangement is generally made up of appropriate lens means, beam splitter means and first and second phase conjugate mirror (PCM) means. The PCM means are mounted on piezoelectric means that are selectively dithered so as to enable control of the return signal. The TR means causes propagation of a rotated laser source beam polarization output via the atmosphere to the CTR arrangement during system use. The CTR arrangement in response to the received laser beam from the TR provides transmission of combined/reflected and phase conjugated beams that are not subject to atmospheric turbulence so as to provide an enhanced two-way communication link with minimal light leakage between the CTR and TR.

8 Claims, 2 Drawing Sheets

TWO-WAY OPTIC COMMUNICATION SYSTEM FOR ATMOSPHERIC USE

This invention relates to a two-way optic communication system for atmospheric use; and, more particularly, it concerns an improved two-way laser-driven optic communication system for atmospheric use where the reflected and combined phase-conjugated return beams are not subject to atmospheric turbulence thereby minimizing component dimensional requirements of the system while at the same time providing an enhanced two-way communication link.

BACKGROUND OF THE INVENTION

In the past various types of optic systems have been utilized. For example, U.S. Pat. No. 4,280,764 to L. Sica et al. relates to a phase conjugate interferometer. The interferometer is generally made up of a laser beam source, first and second beam splitters, a phase conjugate mirror, an angularly adjustable mirror, a surface to be evaluated and an imaging or film recording means. By reason of the beam splitters together with the mirrors, the laser source beam can be directed to the surface to be evaluated and the reflected/combined beams that stem from the surface-reflected source beam are utilized to provide an interferometer pattern on the resolving means for evaluating the characteristics of the surface being evaluated, e.g. rough. U.S. Pat. No. 4,533,247 to R. E. Epworth discloses an optic transmission system for use in free space or with a waveguide means such as an optical fiber. The system is generally made up of a light source, a modulating interferometer at the light transmitting station and a demodulating interferometer at the receiving station along with a photodetector. The system is inoperable unless linked by free space, fiberglass or the like. U.S. Pat. No. 4,491,867 relates to a laser driven device for heterodyne detection of an optical image or target. The device is generally made up of a laser source, an amplifier crystal, frequency shifting means, and photodetector means. The laser source means is simultaneously directed toward an object to be detected and to the amplifier crystal for effecting operation of same. The reflected beam from the target is separated with one separated portion being directed to the amplifier crystal and the other separated portion being directed to the frequency shifting means. The amplified output and the frequency shifted output are then combined to provide an interference output for evaluation by the photodetection means as to the nature of the target detected by the laser beam. However, none of the afore discussed references were remotely concerned with an improved laser-driven two-way optic communication system for use in the atmosphere that effectively compensates for the degradative effects of the atmosphere.

SUMMARY OF THE INVENTION

An object of the invention is to provide an improved laser-driven two-way optic-transmission system for atmospheric use that is provided with a unique transmitter-receiver at one station and a unique cooperative transmitter receiver at another station so as to provide an enhanced communication link with minimal light leakage between the stations.

Another object of the invention is to provide an improved laser-driven two-way optic communication system for atmospheric use having separate transmitter-receiver (TR) and cooperative transmitter-receiver (CTR) stations such that the CTR station is provided with means for selectively dithering at least one of the phase conjugate mirrors therein so as to control the amplitude modulation of the reflected/combined phase-conjugated beams transmitted from the CTR station to the TR station during system use.

And still another object of the invention is to provide an improved laser-driven two-way optic communication system for atmospheric use having TR and CTR means at separate stations wherein the CTR means is provided with phase conjugate mirror means that prevents the phase conjugated return beam from being subject to atmospheric turbulence that would otherwise adversely degrade the return beam.

In brief summary, the improved two-way laser-driven optic communication system for atmospheric use is generally made up of a transmitter-receiver (TR) arrangement at one station and a cooperative transmitter-receiver (CTR) arrangement at another station with the stations being located along the system optic axis. The TR arrangement is generally made up of laser source means, first and second polarizer means, polarized beam rotater (PBR) means and beam expansion/-compression lens (BECL) means. The CTR arrangement is generally made up of beam collimating compression lens (BCCL) means, beam splitter (BS) means and first and second phase conjugate mirror (PCM) means.

During system use, the laser source means provides a laser beam to the first polarizer means. The polarized beam output of the first polarizer means is then rotated in a given plane about the optic axis by the PBR means prior to being subjected to the second polarizer means. The BECL means then provides an expanded rotated and polarized source beam output from the aperture (not shown) of the TR arrangement to the CTR arrangement.

The CTR arangement in receiving the source beam directs same to the BS means. The first PCM means is arranged coincident with the optic axis and is also preferably spaced from the BS means in a direction toward the inner end of the CTR arrangement. The second PCM means is spaced from both the BS means and the first PCM means such that the second PCM means is disposed in angular relation to the first PCM means but with both PCM means separately spaced and equidistant from the BS means. Electric-activated piezoelectric or other suitable means is connected to at least one of the PCM means. By reason of the piezoelectric means, the PCM means can be selectively dithered so that the combined/reflected beams of both PCM means can be selectively phase shifted relative to each other for effecting amplitude modulation so as to control the intensity of the combined beams and thus obtain the desired return signal between the stations. One of the advantages of the PCM means is that the return beams are not subject to atmospheric turbulence that would otherwise cause serious degradation of the return beam and impair the enhanced two-way communication and extended range features of the invention.

In order to monitor the amplitude modulation of the combined/conjugated return beams of the PCM means, the CTR arrangement is provided with detector means operatively associated with the BS means. With the detector means, the user of the CTR arrangement can observe the amplitude modulation of the combined beams. During this observation, selective adjustment of the piezoelectric means can control the distance between a PCM means and the BS means; and thus, the phase shift, if any, between the combined beams thereby effecting the signal and the amplitude modulation of the combined beams.

The TR arrangement is advantageously provided with photo diode means operatively associated with and spaced from the TR first polarizer means. The first polarizer means is provided with partial reflecting means that is effective only on the combined/conjugated return beams received from the CTR arrangement during system use. The TR arrangement upon receiving the combined beams directs them first through the BECL means to compress same and then through the second polarizer means. The PBR means in being disposed after the second polarizer means rotates the combined beams so as to separate them from the source beam prior to the first polarizer means reflecting the combined/rotated beams to the photo diode means for evaluation by the TR user as to the communication effected by the combined beams transmitted from the CTR arrangement. One of the advantages of the PBR means in rotating the return beam is that it not only separates it from the polarized source beam but the first polarizer means reflects the rotated return beam so as not to interfere with the stability of the laser source means.

These and other objects and advantages of the improved optic communication system will become more apparent when taken in conjunction with the accompanying specification and drawings included herein.

DRAWINGS

DETAILED DESCRIPTION OF THE INVENTION

Figure 1:
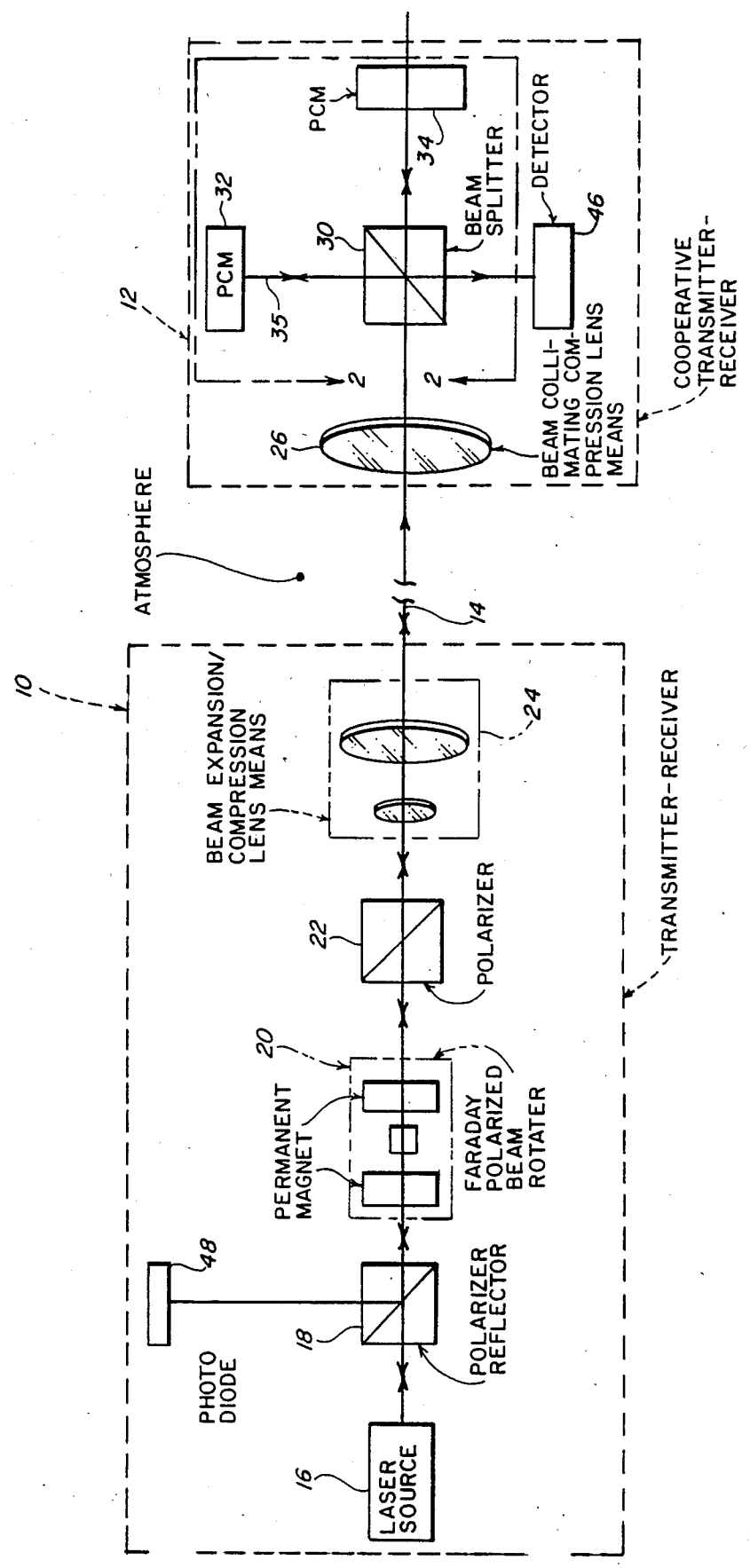
FIG. 1 is a diagrammatic view of a preferred embodiment of the improved laser-driven, two-way optic communication system of the invention as used at a given atmospheric location.

With further reference to FIG. 1, the improved two-way optic communication system for atmospheric use is generally made up of transmitter-receiver (TR) arrangement 10 and a cooperative transmitter receiver (CTR) arrangement 12. The arrangements are disposed in spaced relation to each other at a given atmospheric location such that the arrangements have an optical axis 14 of the system extending therebetween.

The TR arrangement is generally made up of a suitable laser beam source 16, a combined beam polarizer and reflector 18, a polarized beam rotater (PBR) device 20, another beam polarizer 22 and a beam expansion/compression lens (BECL) device 24. The laser beam source directs a laser beam to polarizer reflector 18. The polarizer transmits a polarization coincident with the laser beam that lies in a given plane (not shown) which includes optic axis 14. PBR device 20 is provided with a pair of permanent magnets disposed at either end thereof for effecting partial rotation of the polarized beam output of polarizer 18. It is noted here that in use of the system, source 16 and PBR device 20 should be compatible so as to assure efficient operation of the inventive system during its use. The rotated beam polarization output of device 20 is arranged in another given plane that includes optical axis 14 but is angularly disposed in relation to the first given plane. The polarization direction output of second polarizer 22 is coincident with the rotated polarization beam output of PBR 20. Polarized beam output of device 22 is directed through the double lens arrangement of BECL device 24 so as to effect progressive expansion of the polarized rotated source beam prior to the beam being propagated from TR arrangement 10 along axis 14 and through the atmospheric region to CTR arrangement 12. Although not shown, it is to be understood that TR arrangement 10 is provided with an appropriate housing, aperture, assembly (not shown) adjacent BECL means for transmitting and receiving light beams along axis 14.

CTR arrangement is generally made up of a beam collimating/compression lens (BCCL) device 26, a beam splitter (BS) device 30 and first and second phase conjugating mirror PCM devices 32 and 34. The CTR is also provided with an appropriate aperture housing assembly (not shown) adjacent BCCL means 26. PCM device 34 is spaced rearwardly from BS device 30 and an axis thereof is arranged coincident with optical axis 14 at the inner end of CTR arrangement 12. PCM device 32 is spaced from BS device 30 and PCM device 34 such that an axis of device 32 is preferably arranged at right angles to the axis of device 34. Further, the axis of PCM 32 is coincident with transverse axis 35 of BS device 30. PCM devices 32 and 34 in being spaced from BS device 30 are preferably arranged so as to be equidistant therefrom as represented by dimensional arrows $S_1$ and $S_2$ in FIG. 2. It is noted here that when a laser input beam is received by the CTR arrangement, BCCL means 26 serves to compress the input beam. BS means 30 receives the compressed source beam output from the BCCL means and splits the beam output so as to form one and another beam portions. One beam portion is directed along axis 14 to second PCM device 34 and the other beam portion along axis 35 to first PCM device 32. As the result of the action of PCM devices 32 and 34 on the split beam portions, the phase-conjugated return beam portions of the PCM devices are not subject to atmospheric turbulence when propagating from CTR 12 to TR 10 during system use. The return beams or beam in not being subject to atmospheric turbulence, atmospheric degradation of the return beams is reduced and the improved system provides an enhanced two-way communication link between the TR and CTR arrangements. It is further noted here that by reason of phase conjugation of the return beams, light leaks of the system are also minimized and the useful range of the system is extended than would otherwise be possible.

Figure 2:
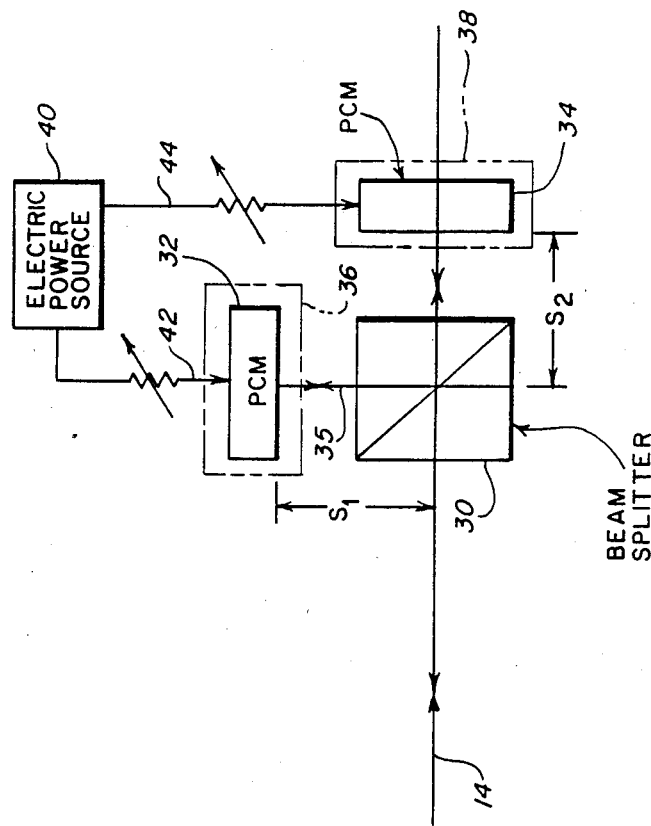
FIG. 2 is an enlarged diagrammatic view, with parts removed and other parts added, taken within the bounds of encompassing line 2—2 of FIG. 2 and illustrates further details of the invention.

With further reference to FIG. 2 each PCM 32 or 34 is appropriately mounted in a piezoelectric (element) or other suitable means 36 and 38. An electric power source 40 is connected by a lead 42 to element 36 and by a lead 44 to element 38. Both leads 42 and 44 are provided with adjustable rheostats or the like so that the power applied to either element 36 or 38 can be the same or different during use of the improved system. If the power is the same to both elements, then PCMs 32 and 34 are dithered the same relative to transverse and optical axes 35 and 14.

With further reference to FIG. 1, BS means 30 of the CTR arrangement advantageously forms part of a combined beam monitoring arrangement. A detector 46 is arranged transverse to optic axis 14 and coincidental with the transverse axis of BS means 30. During operation of the improved system, the combined reflected return beams from PCMs 32 and 34 are partially reflected and directed by BS means 30 to the detector so that the user of the CTR arrangement can evaluate the amplitude modulation of the combined beams being transmitted to TR arrangement 10 in response to the polarized source beam previously transmitted by the TR arrangement. If the amplitude modulation is not sufficient, the electric power to either piezoelectric means 36 and 38 from source 40 is selectively adjusted as aforedescribed until sufficient amplitude modulation (phase shift) between the combined beams of PCMs 32 and 34 is obtained. In other words when the PCMs are selectively dithered, the distances $S_1$ and $S_2$ are selectively changed so that they are either equal or not equal in obtaining the proper amplitude modulation of the combined beams in effecting the desired signal and communication link between the CTR and TR arrangements of the improved system. It is to be understood that, if desired, a second beam splitter could be used in CTR means 12 for reflecting the combined beams to detector 46.

When the combined beams are received by TR arrangement 10 and BECL means 24 thereof, the combined beams are first contracted. Polarizer 22 then passes the contracted combined beams which are traveling in a reverse direction to that of the source beam but polarized in the same fashion. PBR 20 rotates the return beams such that they are angularly offset from the beam output of polarizer 18. By reason at this offsetness between the source and return beams, polarizer/reflector 18 prevents the passage of the return beam to laser source so as not to adversely effect its stability in continuously generating a laser source beam. At the same time the reflector of polarizer/reflector 18 by reason of the offsetness between the laser and return beams as aforedescribed reflects the return rotated beam polarization in a transverse direction toward a photodiode 48 of TR arrangement 10.

In one reduction to practice PBR 20 caused forty-five (45°) rotation of laser source beam polarization in one direction about axis 14. Then PBR 20 caused an additional 45° rotation of the return beam polarization in the same direction so that the laser beam output of device 18 prior to being rotated by PBR device 20 is angularly offset from the rotated return and phase conjugated beam polarization output of PBR 20 by ninety degrees (90°). It should also be evident that by virtue of the phase conjugated return beam not being subject to atmospheric turbulence that the dimensional requirements of various components of the improved system are reduced for any given communication range desired between the TR and CTR stations of the system.

Obviously many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A two-way optic communication system for atmospheric use comprising:
    transmitter-receiver TR means and cooperative transmitter-receiver CTR means where the TR means and the CTR means have an optical axis extending therebetween and are arranged relative to and spaced from each other along the optical axis of the system so as to define an atmosphere region therebetween and also to effect propagation of opposed beams with minimal leakage and in opposite directions therebetween;
    the TR means being made up of laser source means, first and second polarizer means, polarized beam rotator PBR means and beam expansion/compression lens BECL means, the PBR means being interposed between the first and second polarizer means, the BECL means being disposed outwardly of and spaced from the second polarizer means, the laser source means projecting a polarized source beam through the first polarizer means, the PBR means, the second polarizer means and the BECL means such that the PBR means rotates the polarized source beam output of the first polarizer means a predetermined amount in a direction about the optical axis prior to the rotated and polarized source beam output of the PBR means being passed through the second polarizer means, the BECL means providing outward lateral expansion of the polarized and rotated source beam output of the second polarizer means as the beam output is propagated along the optical axis in one direction from the TR means to the CRT means, and
    the CTR means being generally made up of beam collimating/ compression lens BCCL means, beam splitter BS means and first and second phase conjugate mirror PCM means, the first and second PCM means being disposed in spaced operative and angular relation to the BS means such that one of the PCM means is coincident with the optical axis but spaced from the BS means in a direction toward the inner end of the CTR means while the other PCM means is disposed within the CTR means but spaced from both the BS means and the one PCM means and arranged in angular relation to the one PCM means and the optical axis therethrough, the BS means for splitting the polarized and rotated source beam output after the BCCL means so as to form one and an other beam portions with one beam portion being directed to the first PCM means and with the other beam portion being directed to the second PCM means, the first and second PCM means reflecting the one and other beam portions and directing them toward the BS means, while at the same time the first and second PCM means cause phase conjugation of the reflected one and the other beam portions; the BS means combining the reflected one and other phase conjugated beam portions and then directing them for propagation along the optical axis in a direction toward the BCCL means and the TR means, the BCCL means for collimating the reflected and combined phase conjugated beam portions whereby the combined and reflected phase conjugated beam portions in propagating from the CTR means as a collimated output of the BCCL means to the TR means are not subject to atmospheric turbulence during system use.

2. A system as set forth in claim 1 wherein the first and second PCM means are arranged equidistant from the BS means of the CTR means.

3. A system as set forth in claim 1 wherein the first and second PCM means are each provided with separate piezoelectric (PE) means, each PE means including means for selectively dithering its associated PCM means of the first and second PCM means so as to selectively change the distance between the BS means and a given PCM means thereby resulting in an amplitude modulation between the combined/reflected beam portions so as to control the signal thereof.

4. A system as set forth in claim 3 wherein the CTR means is provided with detector means spaced from and operatively associated with the BS means such that the BS means includes means for reflecting the combined/reflected beam portions relative to selective dithering of one or the other PCM means during system use.

5. A system as set forth in claim 1 wherein the TR means is comprised of photo diode means spaced from and operatively associated with the first polarizer means, and wherein the first polarizer means is provided with reflector means for reflecting propagated combined/reflected beam portions of the PCM means of the CTR means when a rotated and polarized source beam of the TR means is propagated to the CTR means during system use.

6. A system as set forth in claim 1 wherein the second polarizer means of the TR means provides a polarized output of the combined/reflected beam portions from the CTR means, wherein the first polarizer means of the TR means is also provided with reflecting means, wherein the TR means is provided with photo diode means spaced from and operatively associated with the reflecting means of the first polarizer means, and wherein the PBR means of the TR rotates the polarized output of the second polarizer means and provides a polarized and rotated output to the first polarizer means prior to the reflecting means of the first polarizer means reflecting the polarized and rotated output of the PBR means to the photo diode means for evaluation.

7. A system as set forth in claim 6 wherein the PBR means of the TR means in causing rotation in one direction about the optical axis of the output of the source/polarized beam of the first polarizer means and also in causing further rotation in the one direction about the optical axis of the output of the polarized and combined/reflected beam portions of the second polarizer means results in the source/polarized beam being offset from the polarized and combined/reflected beam portions.

8. A system as set forth in claim 7 wherein the source polarized beam and polarized and combined reflected beam portions propagate along the optical axis in opposite directions relative to each other during system use.

* * * * *